United States Patent
Kanno et al.

(10) Patent No.: US 7,008,526 B2
(45) Date of Patent: Mar. 7, 2006

(54) PROCESSES FOR PRODUCING COKE, ARTIFICIAL GRAPHITE AND CARBON MATERIAL FOR NEGATIVE ELECTRODE OF NON-AQUEOUS SOLVENT TYPE SECONDARY BATTERY AND PITCH COMPOSITION USED THEREFOR

(75) Inventors: Koichi Kanno, Ibaraki (JP); Hirotaka Tsuruya, Ibaraki (JP); Ryuji Fujiura, Ibaraki (JP)

(73) Assignee: Mistubishi Gas Chemical Company, Inc., Tokyo (JP)

( * ) Notice: Subject to any disclaimer, the term of this patent is extended or adjusted under 35 U.S.C. 154(b) by 523 days.

(21) Appl. No.: 09/923,373

(22) Filed: Aug. 8, 2001

(65) Prior Publication Data

US 2002/0027066 A1 Mar. 7, 2002

(30) Foreign Application Priority Data

Sep. 6, 2000 (JP) .............................. 2000-270315

(51) Int. Cl.
*C10C 1/16* (2006.01)
*C10C 1/19* (2006.01)
*C10C 3/04* (2006.01)
*C10C 3/14* (2006.01)

(52) U.S. Cl. ............................ 208/22; 208/23; 208/39; 208/44; 585/11; 585/422; 423/447.4

(58) Field of Classification Search .................. 208/22, 208/23, 39, 44; 585/11, 422; 423/447.4
See application file for complete search history.

(56) References Cited

U.S. PATENT DOCUMENTS

| 4,891,126 | A | * | 1/1990 | Mochida et al. | ............... 208/39 |
| 5,843,298 | A | * | 12/1998 | Orac et al. | ..................... 208/42 |
| 6,153,004 | A | * | 11/2000 | Hayner | ........................ 106/274 |
| 6,521,380 | B1 | * | 2/2003 | Ryu et al. | ................. 429/231.8 |

FOREIGN PATENT DOCUMENTS

| JP | 45 013453 B | | 11/1966 |
| JP | 01-282346 | * | 11/1989 |
| JP | 01-282346 A | | 11/1989 |
| JP | 02-175021 A | | 7/1990 |
| JP | 09-251855 A | | 9/1997 |
| KR | 9305524 | | 6/1993 |

OTHER PUBLICATIONS

Kanno, et al., "Modifications To Carbonization Of Mesophase Pitch By Addition Of Carbon Blacks", in *Carbon* vol. 35, No. 10-11, pp. 1627-1637 (1997).

* cited by examiner

*Primary Examiner*—Tam M. Nguyen
(74) *Attorney, Agent, or Firm*—Antonelli, Terry, Stout and Kraus, LLP.

(57) ABSTRACT

When a pitch composition prepared by mixing 100 parts by weight of mesophase pitch with 10 to 1,000 parts by weight of coal tar pitch, is heat-treated at a temperature of 500° C. or higher, it is possible to produce a high-density coke at a high yield while avoiding the foaming of the mesophase pitch. In addition, when the coke is graphitized at a temperature of 2,000° C. or higher, it is possible to obtain an artificial graphite having a high graphitization degree. Further, when the coke is first pulverized and then graphitized at a temperature of 2,000° C. or higher, it is possible to obtain a high-crystallinity graphite powder which can be suitably used as a carbon material for a negative electrode of non-aqueous solvent type secondary battery having a high discharge capacity and a high charge-discharge efficiency.

5 Claims, No Drawings

PROCESSES FOR PRODUCING COKE, ARTIFICIAL GRAPHITE AND CARBON MATERIAL FOR NEGATIVE ELECTRODE OF NON-AQUEOUS SOLVENT TYPE SECONDARY BATTERY AND PITCH COMPOSITION USED THEREFOR

BACKGROUND OF THE INVENTION

1. Field of the Invention

The present invention relates to processes for producing coke, an artificial graphite having a high graphitization degree, a carbon material for a negative electrode of non-aqueous solvent type secondary battery having a high discharge capacity and a high charge-discharge efficiency, from mesophase pitch (optically anisotropic pitch), and a pitch composition mainly used for the production of these substances.

2. Description of the Prior Art

Mesophase pitch is an excellent carbon material capable of producing pitch coke having a high graphitizability at a high yield. However, when the mesophase pitch is held in an electric furnace and heat-treated therein, gases are generated therefrom, so that the pitch is foamed and the volume thereof increases several tens times. Thus, the production of coke from the mesophase pitch has a problem concerning its productivity. Also, in the case where the mesophase pitch is used as a binder to produce a carbon-based molding material, the pitch is foamed by gases generated. As a result, there arises such a problem that coke derived from the mesophase pitch which is contained in the carbon-based molding material exhibits a low density.

Japanese Patent Application Laid-open No. Heisei 6(1994)-299076 discloses a method of adding carbon black to mesophase pitch in order to inhibit the foaming of the mesophase pitch.

However, the coke produced by the above method of adding carbon black to mesophase pitch, shows a poor graphitizability due to strong interaction between carbon black and mesophase pitch, thereby failing to obtain an artificial graphite having a high graphitization degree. Therefore, it has been required to provide not only a process for producing high-density coke at a high productivity while avoiding foaming of the mesophase pitch, but also a process for producing an artificial graphite having a high graphitization degree.

In addition, recently, lithium ion secondary batteries having a negative electrode made of a carbon material, have been rapidly put into practice as a power source for various electronic devices used in the current high information-oriented society, because these batteries show a high voltage and a high-energy density and are excellent in safety and cycle characteristics.

Natural graphite conventionally used exhibits a high discharge capacity due to its higher crystallinity as compared to those of other carbon materials. However, it is required that the natural graphite is pulverized in order to prepare a negative electrode material therefrom. Therefore, the pulverized natural graphite has a large surface area, which results in low charge-discharge efficiency at initial cycle. In addition, the natural graphite is deteriorated in cycle life since it contains a large amount of impurities such as metal components.

Accordingly, it has also been required to provide carbon materials containing a less amount of impurities such as metal components and exhibiting a high charge-discharge efficiency at initial cycle. As carbon materials satisfying such a requirement, Japanese Patent Application Laid-open No. Heisei 10(1998)-121054 discloses a graphite powder containing a less amount of impurities and exhibiting a crystallinity compatible to that of natural graphite, which is produced by heat-treating specific mesophase pitch in a specific temperature range in a non-oxidative atmosphere, and then successively subjecting the heat-treated material to pulverization and graphitization.

However, the graphite powder obtained in Japanese Patent Application Laid-open No. Heisei 10(1998)-121054 has a highly-oriented flow structure. Therefore, when such a graphite powder is used as an electrode material for secondary batteries, there is caused such a problem that the solvent contained in an electrolyte solution shows a high decomposition activity upon charging due to the crystal structure on the surface of the graphite powder, which results in deteriorated charge-discharge efficiency of the batteries. Further, as described above, the mesophase pitch is undesirably foamed by gases generated when heat-treated in an electric furnace, so that the volume thereof increases up to several tens times, thereby causing the problem concerning its productivity. Accordingly, it has been demanded to provide a process for producing a graphite powder capable of realizing not only a high productivity but also a high discharge capacity and a high charge-discharge efficiency of finally produced batteries.

SUMMARY OF THE INVENTION

An object of the present invention is to solve the above-described conventional problems, and provide a process for producing high-density coke from mesophase pitch at a high productivity while avoiding foaming of the mesophase pitch, a process for producing an artificial graphite having a high graphitization degree from the coke, and a process for producing a carbon material for a negative electrode of non-aqueous solvent type lithium ion secondary battery, etc., having a high discharge capacity and a high charge-discharge efficiency, from the coke.

As a result of extensive researches for solving the above problems, the present inventors have found that when a pitch mixture containing 100 parts by weight of mesophase pitch and 10 to 1,000 parts by weight of coal tar pitch is heat-treated at a temperature of 500° C. or higher, the high-density coke is produced at a high productivity while avoiding foaming of the mesophase pitch; when the coke is graphitized at a temperature of 2,000° C. or higher, it is possible to obtain an artificial graphite having a high graphitization degree; and when the coke is pulverized and graphitized at a temperature of 2,000° C. or higher, it is possible to obtain a high-crystallinity graphite powder which can be suitably used as a carbon material for a negative electrode of non-aqueous solvent type secondary battery having a high discharge capacity and a high charge-discharge efficiency. The present invention has been accomplished on the basis of the above findings.

Thus, the present invention provides:

a process for producing coke, which process comprises the steps of mixing 100 parts by weight of mesophase pitch with 10 to 1,000 parts by weight of coal tar pitch to prepare a pitch composition; and heat-treating the pitch composition at a temperature of 500° C. or higher;

a process for producing an artificial graphite, which process comprises the step of graphitizing the coke at a temperature of 2,000° C. or higher;

a process for producing a carbon material for a negative electrode of non-aqueous solvent type secondary battery, which process comprises the steps of pulverizing the coke, and graphitizing the pulverized coke at a temperature of 2,000° C. or higher; and a pitch composition comprising 100 parts by weight of mesophase pitch and 10 to 1,000 parts by weight of coal tar pitch, and having an optically anisotropic content of 1 to 99% by volume.

DETAILED DESCRIPTION OF THE INVENTION

The mesophase pitch used herein is such a pitch containing optically anisotropic components in an amount of 50% or higher when an optical structure of the pitch embedded in resin and polished by ordinary method, is observed using a polarizing microscope. The mesophase pitch may be of any type such as petroleum-based pitches, coal-based pitches and synthetic pitches. In addition, the mesophase pitch preferably has a softening point of 150° C. or higher as measured by an elevated flow tester method, and a carbonization yield of 70% or higher. Here, the "carbonization yield" means a percentage of carbonized product yielded when mesophase pitch powder is heated to 600° C. at a temperature rise rate of 10° C./min. in an inert gas atmosphere and then the resultant product is allowed to stand at that temperature for 2 hours.

Among these mesophase pitches, preferred pitches are synthetic mesophase pitches produced by polymerizing a condensed polycyclic hydrocarbon such as naphthalene, methyl naphthalene, anthracene, phenanthrene, acenaphthene, acenaphthylene and pyrene, in the presence of hydrogen fluoride-boron trifluoride as a superstrong acid catalyst, since the synthetic mesophase pitches exhibit a high chemical purity, an excellent graphitizability and an extremely high carbonization yield.

As the coal tar pitch to be mixed with the mesophase pitch, there may be usually used ordinary coal tar pitches produced from coal tar, such as soft pitch, medium soft pitch and hard pitch. Of these coal tar pitches, impregnated pitches containing substantially no primary quinoline insolubles (QI) is especially preferred because of a higher graphitizability thereof. Further, there may also be suitably used modified coal tar pitches produced by adding a tar wash oil or the like to coal tar pitch in order to impart a good fluidity thereto.

In the present invention, 100 parts by weight of the mesophase pitch is mixed with 10 to 1,000 parts by weight of the coal tar pitch to prepare a pitch composition. When the amount of the coal tar pitch mixed is less than 10 parts by weight, it is not possible to effectively prevent the pitch from being foamed. On the other hand, when the amount of the coal tar pitch mixed is more than 1,000 parts by weight, the pitch is deteriorated in carbonization yield as well as graphitizability. Although the mixing method is not particularly restricted, there may be used a method of pulverizing and mixing the pitches together in a solid state or a method of kneading the pitches together in a molten state.

The thus obtained pitch composition exhibits an optically anisotropic content of 1 to 99% by volume, preferably 10 to 90% by volume, and is suitably used not only for the production of the coke, artificial graphite and carbon material for a negative electrode of non-aqueous solvent type secondary battery according to the present invention, but also as a binder for the production of carbon-based molded articles.

The coke is produced by heat-treating the pitch composition at a temperature of 500° C. or higher. The heat treatment of the pitch composition may be performed by charging the pitch composition into a heat-resistant container and then subjecting the pitch composition filled in the container to heat treatment in a furnace. Also, the heat treatment may be conducted using a conveyor-type continuous heat-treating furnace or the like.

If only the mesophase pitch is heat-treated in an electric furnace without adding the coal tar pitch thereto, the mesophase pitch is foamed by gases generated upon the heat treatment, so that the volume thereof increases several tens times. On the contrary, in the present invention, since the coal tar pitch having a relatively low carbonization reaction rate is added to the mesophase pitch, the viscosity of the reaction system is kept low until reaching a high temperature, thereby inhibiting the growth of foams. As a result, it becomes possible to produce the high-density coke at a high yield without violent foaming phenomenon observed when the mesophase pitch is used alone.

Further, the pitch composition of the present invention may further contain sulfur in an amount of 0.1 to 100 parts by weight, preferably 1 to 30 parts by weight based on 100 parts by weight of the pitch mixture composed of the mesophase pitch and the coal tar pitch in order to further inhibit the pitch from being foamed and more effectively produce coke. Further, as described hereinafter, the use of such a sulfur-containing pitch composition also enables the production of a carbon material for a negative electrode of non-aqueous solvent type secondary battery having a high discharge capacity and a high charge-discharge efficiency.

Although the method of mixing sulfur in the pitch composition is not particularly restricted, there may be used a method of mixing sulfur with the pitches using a mixer or the like while keeping both in a powder state; a method in which sulfur is wet-mixed with the pitches using a solvent such as water or methanol, and then the resultant mixture is dried; or a method of mixing and stirring sulfur with the pitches while keeping either or both of sulfur and the pitches in a molten state.

Then, the coke is graphitized at a temperature of 2,000° C. or higher to produce an artificial graphite having a high graphitization degree. Also, the coke is first pulverized and then graphitized at a temperature of 2,000° C. or higher to produce a carbon material for a negative electrode of non-aqueous solvent type secondary battery. In both the cases of producing the artificial graphite and the carbon material for a negative electrode of non-aqueous solvent type secondary battery, sulfur is preferably added to the pitch composition upon the production of coke in order to realize a high discharge capacity and a high charge-discharge efficiency.

Upon the production of the carbon material for a negative electrode of non-aqueous solvent type secondary battery, the pitch coke is pulverized and classified in order to obtain a coke powder having an average particle size of usually 1 to 50 $\mu$m, preferably 2 to 30 $\mu$m. The pulverizer used above may be appropriately selected from optimum apparatuses such as impact crusher and jet mill. The classifier used above may also be appropriately selected from optimum apparatuses such as mechanical classifier and air classifier.

Then, the thus pulverized carbonaceous powder may be usually calcined before graphitization thereof. Alternatively, the calcination step may be omitted, and the carbonaceous powder may be directly subjected to graphitization immediately after the pulverization. In general, the calcination step, if any, may be performed at a temperature of 800 to 1,600° C. in a non-oxidative atmosphere.

The thus obtained powder is then graphitized at a temperature of 2,000° C. or higher, preferably 2,500° C. or higher to obtain a graphite powder having a high graphitization degree and containing a less amount of metal components. The graphite powder is free from deterioration in charge-discharge efficiency due to the decomposition of solvent contained in an electrolyte solution upon charging, unlike graphite powder prepared from mesophase pitch alone. Therefore, the graphite powder of the present invention can realize a high discharge capacity and a high charge-discharge efficiency, thereby enabling the production of a lithium ion secondary battery as an industrial product having a high performance and a high reliability.

As is apparent from the following examples, in accordance with the present invention, when the pitch composition prepared by mixing mesophase pitch with coal tar pitch is heat-treated, the mesophase pitch is effectively prevented from being foamed, so that pitch coke can be produced at a high yield.

Also, in the present invention, when the pitch coke is graphitized at a temperature of 2,000° C. or higher, it is possible to produce an artificial graphite having a high graphitization degree.

Further, in the present invention, when the pitch coke is pulverized and then graphitized at a temperature of 2,000° C. or higher, it is possible to produce a high-crystallinity graphite powder exhibiting a high discharge capacity and a high charge-discharge efficiency, thereby enabling the production of a lithium secondary battery having a high energy density.

The pitch composition of the present invention is useful for the production of the above pitch coke, artificial graphite and carbon material for a negative electrode of non-aqueous solvent type secondary battery, and may also be suitably used as a binder for the production of carbon-based molded articles.

EXAMPLES

The present invention will be described more specifically by reference to the following examples. However, these examples are only illustrative and not intended to limit the present invention thereto.

Example 1

Naphthalene was polymerized in the presence of hydrogen fluoride-boron trifluoride to produce a pitch having a softening point of 235° C., an optically anisotropic content of 100% and a carbonization yield of 87%. One hundred parts by weight of the thus obtained pitch and 100 parts by weight of coal tar pitch having a softening point of 80° C., an optically anisotropic content of 0% and a carbonization yield of 45% were pulverized and mixed using a coffee mill to prepare a pitch composition composed of mesophase pitch and coal tar pitch. The obtained pitch composition was melted at 330° C. to prepare a uniform pitch melt. The pitch melt was cooled and embedded into resin. The pitch-embedded resin was polished by ordinary method, and the optical structure of the pitch was observed by a polarizing microscope. As a result, it was confirmed that the pitch exhibited an optically anisotropic content of 55%.

Ten grams of the pitch composition was charged into 100 cc glass beaker, and the glass beaker was placed in a muffle furnace kept under nitrogen flow. In the furnace, the pitch composition was heated to 600° C. at a temperature rise rate of 5° C./min., and held at that temperature for one hour to obtain coke. As a result, it was confirmed that the yield of the coke obtained by the 600° C. heat-treatment was 64%, and the apparent volume thereof after the heat-treatment was 20 cc.

After cooling to room temperature, the obtained coke was pulverized into a powder having an average particle size of 15 μm using a ball mill. The resultant powder was heated up to 1,000° C. at a temperature rise rate of 5° C./min. in a nitrogen atmosphere, and then held at 1,000° C. for 10 minutes for calcination thereof. Successively, the calcined powder was graphitized at 3,000° C. in an argon atmosphere to obtain a graphite powder. As a result of analyzing a crystal structure of the obtained graphite powder by X-ray diffraction method, it was confirmed that the lattice spacing $d_{002}$ of crystallite at (002) place was 0.3357 nm, and the crystallite size Lc was 250 nm, and therefore the graphite powder had a high graphitization degree.

Example 2

One hundred parts by weight of the mesophase pitch and 100 parts by weight of the coal tar pitch which both were the same as those used in EXAMPLE 1, were pulverized and mixed using a coffee mill to prepare a pitch composition composed of mesophase pitch and coal tar pitch. One hundred parts by weight of the obtained pitch composition and 5 parts by weight of sulfur were further pulverized and mixed using a coffee mill to prepare a pitch/sulfur mixture. Ten grams of the resultant mixture was charged into 100 cc glass beaker, and the glass beaker was placed in a muffle furnace kept under a nitrogen flow. In the furnace, the mixture was heated to 600° C. at a temperature rise rate of 5° C./min., and held at that temperature for one hour to obtain coke. As a result, it was confirmed that the yield of the coke obtained by the 600° C. heat-treatment was 70%, and the apparent volume thereof after the heat-treatment was 15 cc.

After cooling to room temperature, the obtained coke was pulverized into a powder having an average particle size of 15 μm using a ball mill. The resultant powder was heated up to 1,000° C. at a temperature rise rate of 5° C./min. in a nitrogen atmosphere, and then held at 1,000° C. for 10 minutes for calcination thereof. Successively, the calcined powder was graphitized at 3,000° C. in an argon atmosphere to obtain a graphite powder. As a result of analyzing a crystal structure of the obtained graphite powder by X-ray diffraction method, it was confirmed that the lattice spacing $d_{002}$ of crystallite at (002) place was 0.3359 nm, and the crystallite size Lc was 150 nm, and therefore the graphite powder had a high graphitization degree.

Ninety parts by weight of the thus obtained carbon material and 10 parts by weight of a polyvinylidene fluoride powder as a binder were mixed together with dimethylformamide as a solvent. The resultant mixture was applied onto a copper foil, and then dried. The coated foil was cut into 1 cm square to prepare a test specimen for the evaluation. Then, the test specimen was used as an electrode together with an electrolyte solution prepared by dissolving $LiPF_6$ in a mixed solvent containing ethylene carbonate and diethylcarbonate at a mixing ratio of 1:1 (concentration: 1.0 mol/l), and a separator formed of a 50 μm-thick polypropylene microporous membrane in order to prepare a half cell. Further, in the cell, both a counter electrode and a reference electrode were formed of metallic lithium having a diameter of 16 mm and a thickness of 0.5 mm. The thus prepared half cell was subjected to constant current charge at a current density of 0.2 mA/cm² until the electrode potential of the test specimen relative to the reference electrode reached 10 mV. Then, the cell was subjected to constant current discharge at a current density of 0.2 mA/cm² until the electrode potential of the test specimen relative to the reference electrode reached 1.5 V. As a result, it was confirmed that the charge capacity of the cell at initial cycle was 347 mAh/g; the discharge capacity thereof was 330 mAh/g; and the charge-discharge efficiency thereof was as high as 95.0%. Further, at the third cycle after conducting the second cycle under the same conditions as those of the initial cycle, the cell was subjected to constant-current/constant-voltage charge at a current density of 1.0 mA/cm$^2$ for 12 hours while maintaining the electrode potential of the test specimen relative to the reference electrode at 10 mV. Then, the cell was subjected to constant current discharge at a current density of 0.2 mA/cm$^2$ until the electrode potential of the test specimen relative to the reference electrode reached 1.5 V. As a result, it was confirmed that the charge capacity of the cell at the third cycle was 345 mAh/g; the discharge capacity thereof was 342 mAh/g; and the charge-discharge efficiency thereof was as high as 99.1%.

Example 3

One hundred parts by weight of the mesophase pitch and 60 parts by weight of the coal tar pitch which both were the same as those used in EXAMPLE 1, were pulverized and mixed using a coffee mill to prepare a pitch composition composed of mesophase pitch and coal tar pitch. The pitch composition had an optically anisotropic content of 65%.

One hundred parts by weight of the pitch composition and 7 parts by weight of sulfur was further pulverized and mixed using a coffee mill to prepare a pitch/sulfur mixture. Ten grams of the resultant mixture was charged into a 100 cc glass beaker, and the glass beaker was placed in a muffle furnace kept under a nitrogen flow. In the furnace, the mixture was heated to 600° C. at a temperature rise rate of 5° C./min., and held at that temperature for one hour to obtain coke. As a result, it was confirmed that the yield of the coke obtained by the 600° C. heat-treatment was 75%, and the apparent volume thereof after the heat-treatment was 20 cc.

After cooling to room temperature, the obtained coke was pulverized into a powder having an average particle size of 15 μm using a ball mill. The resultant powder was heated up to 1,000° C. at a temperature rise rate of 5° C./min. in a nitrogen atmosphere, and then held at 1,000° C. for 10 minutes for calcining the powder. Successively, the calcined powder was graphitized at 3,000° C. in an argon atmosphere to obtain a graphite powder. As a result of analyzing a crystal structure of the obtained graphite powder by X-ray diffraction method, it was confirmed that the lattice spacing d$_{002}$ of crystallite at (002) place was 0.3359 nm, and the crystallite size Lc was 160 nm, and therefore the graphite powder had a high graphitization degree.

A lithium cell was prepared in the same manner as in EXAMPLE 2, and the negative electrode performance of the cell was measured by the same method as in EXAMPLE 2. As a result, it was confirmed that at the initial cycle, the charge capacity of the cell was 354 mAh/g, the discharge capacity thereof was 334 mAh/g, and the charge-discharge efficiency thereof was as high as 94.3%; and at the third cycle, the charge capacity of the cell was 347 mAh/g, the discharge capacity thereof was 345 mAh/g, and the charge-discharge efficiency thereof was as high as 99.4%.

Comparative Example 1

Ten grams of the same mesophase pitch as used in EXAMPLE 1 was charged into a 100 cc glass beaker, and the glass beaker was placed in a muffle furnace kept under a nitrogen flow. In the furnace, the mesophase pitch was heated to 600° C. at a temperature rise rate of 5° C./min., and then held at that temperature for one hour to obtain coke. As a result, it was confirmed that the yield of the coke obtained by the 600° C. heat-treatment was 90%, and the apparent volume thereof after the heat-treatment was as large as about 170 cc, namely the coke was considerably foamed and swelled up beyond the periphery of the beaker.

After cooling to room temperature, the obtained coke was pulverized into a powder having an average particle size of 15 μm using a ball mill. The resultant powder was heated up to 1,000° C. at a temperature rise rate of 5° C./min. in a nitrogen atmosphere, and then held at 1,000° C. for 10 minutes for calcining the powder. Successively, the calcined powder was graphitized at 3,000° C. in an argon atmosphere to obtain a graphite powder. As a result of analyzing a crystal structure of the obtained graphite powder by X-ray diffraction method, it was confirmed that the lattice spacing d$_{002}$ of crystallite at (002) place was 0.3357 nm, and the crystallite size Lc was 250 nm, and therefore the graphite powder had a high graphitization degree.

A lithium cell was prepared in the same manner as in EXAMPLE 2, and the negative electrode performance of the cell was measured by the same method as in EXAMPLE 2. As a result, it was confirmed that at the initial cycle, the charge capacity of the cell was 525 mAh/g, the discharge capacity thereof was 315 mAh/g, and the charge-discharge efficiency thereof was as low as 60%; and at the third cycle, the charge capacity of the cell was 340 mAh/g, the discharge capacity thereof was still as low as 325 mAh/g, and the charge-discharge efficiency thereof also remained as low as 95.6%.

What is claimed is:

1. A process for producing a carbon material for a negative electrode of a non-aqueous solvent type secondary battery, comprising:
    (1) mixing 100 parts by weight of mesophase pitch which is produced by polymerizing a condensed polycyclic hydrocarbon or a substance containing the condensed polycyclic hydrocarbon in the presence of hydrogen fluoride-boron trifluoride, with 10 to 1,000 parts by weight of coal tar pitch which contains substantially no quinoline insolubles (QI) to produce a pitch composition having an optically anisotropic content of 1 to 99% by volume,
    (2) further mixing 1 to 30 parts by weight of sulfur per 100 parts by weight of the pitch composition obtained in step (1),
    (3) heat-treating the pitch composition obtained in step (2) at a temperature of 500° C. or higher,
    (4) pulverizing the coke produced in step (3) to provide a coke powder, and
    (5) graphitizing the coke powder at a temperature of 2000° C. or higher to form a graphite powder adapted to be used for the carbon material for the negative electrode of the non-aqueous solvent type secondary battery.

2. The process according to claim 1, wherein the mesophase pitch has a softening point of 150° C. or higher as measured by an elevated flow tester method, and a carbonization yield of 70% or higher.

3. The process according to claim 1, wherein said pitch composition obtained in step (1) has an optically anisotropic content of 10 to 90% by volume.

4. The process according to claim 1, wherein the coke produced in step (3) is pulverized and classified so as to provide a coke powder having an average particle size of 1 to 50 μm.

5. The process according to claim 4, wherein said average particle size is 2 to 30 μm.

* * * * *